UNITED STATES PATENT OFFICE.

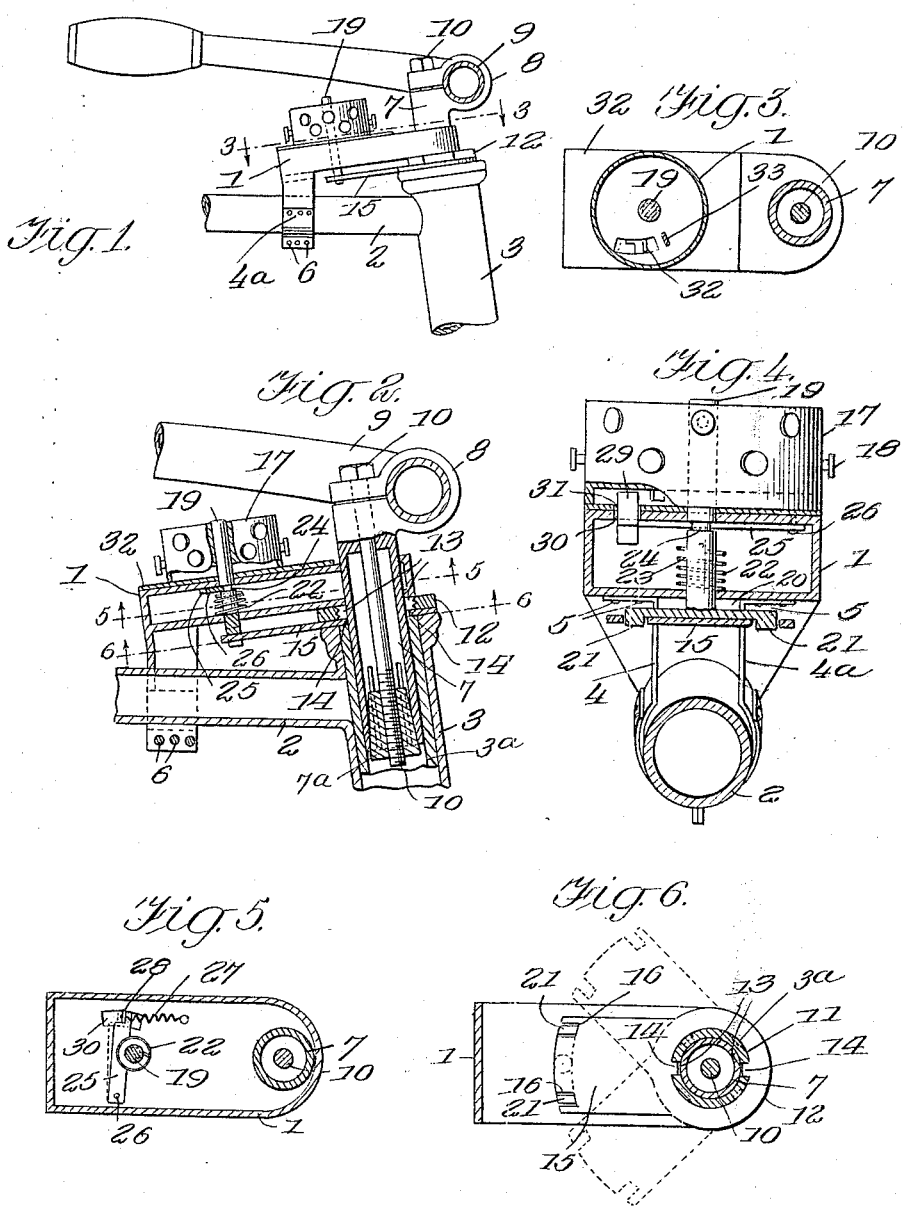

GEORGE A. WEHNER, OF SAVANNAH, GEORGIA.

BICYCLE-LOCK.

1,192,718. Specification of Letters Patent. Patented July 25, 1916.

Application filed May 6, 1913, Serial No. 765,836. Renewed January 11, 1916. Serial No. 71,574.

*To all whom it may concern:*

Be it known that I, GEORGE A. WEHNER, a citizen of the United States, and a resident of Savannah, in the county of Chatham and State of Georgia, have invented a new and useful Improvement in Bicycle-Locks, of which the following is a specification.

My invention is an improvement in bicycle locks, and has for its object to provide mechanism of the character specified, for locking the steering post of a bicycle from angular movement and so arranged that the said mechanism may be held or released by a permutation lock of the character shown in my copending application, Serial No. 754,848, filed March 17, 1913.

In the drawings:—Figure 1 is a side view of a portion of a bicycle provided with the improved lock, Fig. 2 is a vertical section of a portion of the bicycle and the lock, Fig. 3 is a section on the line 3—3 of Fig. 1, looking in the direction of the arrows, Fig. 4 is a rear view of the locking mechanism with parts in section, and Figs. 5 and 6 are sections on the lines 5—5 and 6—6 respectively, of Fig. 2.

The present embodiment of the invention is shown in connection with a bicycle, and the said mechanism comprises a casing 1, having a sectional bearing clip for embracing the connecting bar 2 that connects the steering sleeve 3 with the seat supporting sleeve (not shown). The sections 4 and 4ᵃ of the said clip are secured to the under face of the casing 1, as indicated at 5, and the said sections are secured together below the bar 2, by means of rivets 6 or the like. The said casing is provided with an opening at its front end through which the steering post 7 of the bicycle extends, the said post being clamped to the body 3ᵃ of the steering fork (not shown) by means of a conical nut 7ᵃ, arranged in the split lower end of the steering post, and pulled upward by means of the threaded clamping bolt 10.

The upper end of the post 7 is provided with the usual split bearing 8 for clamping the handle bars 9, and the bolt 10 passes through the free end of the bearing and engages the post in the usual manner. The split end of the post 7 is conical or tapering internally to fit the nut and when the head of the bolt 10 is turned to draw the nut upward, the steering post is clamped to the body 3ᵃ of the steering fork, so that when the handle bars 9 are swung, the bicycle may be steered.

The upper end of the body 3ᵃ of the steering fork extends above the upper end of the sleeve 3, and the said upper end is externally threaded and engaged by the usual nut 12. The said body 3ᵃ of the steering fork is provided with oppositely arranged slots 13, for receiving tongues 14 on a locking plate 15. The said tongues 14 engage the slots to hold the plate 15 rigid with the body 3ᵃ of the steering or front wheel fork, and when the lock is released, the said plate 15 may swing angularly with the post and fork body, as indicated in dotted lines in Fig. 6. The plate 15 is provided with an opening at its front end through which the post and the fork body extend, and the slots 13 extend to the upper end of the fork body so that the plate may be engaged with the fork body by fitting the plate over the upper end of the same. The nut 12 by its engagement with the sleeve above the plate holds the said plate in firm position. The plate 15 is provided at its rear end with a pair of parallel recesses or notches 16, the said recesses or notches 16, being at the opposite sides of the plate. The combination lock 17 forms the subject-matter of my above-mentioned copending application, Serial No. 754,848, and the said lock is so arranged that the outer portion or knob thereof cannot be turned until certain predetermined of the push buttons 18 of the said lock are depressed. When the predetermined push buttons have been depressed, the sleeve is free to rotate with respect to its support which is secured to the casing 1. A pin 19 is arranged at the center of the lock, and at the axis upon which the knob rotates, the said pin being movable vertically with respect to the lock and with respect to the plate 15. The lower end of the pin is provided with a cross head 20, and the cross head is provided at each end with a downwardly extending lug 21, and the said lugs are designed to engage the notches 16 of the plate 15 when the pin or post 19 is in lowered position. A coil spring 22 encircles the pin or post between the bottom of the casing 1, and a stop 23 arranged transversely of the pin, and the said pin is provided with an annular groove 24, above the stop. The groove 24 is adapted for engagement by a latch lever 25, the said lever being pivoted at 26, to the under face of the top of the casing, and when the said lever is in engagement with the pin 19, the said pin is prevented from longitudinal movement in the lock. A spring 27 is arranged between the lug 28 on the lever, and the top of the casing 1, the said spring acting normally to draw the free end of the lever 25 toward the pin 19, that is, to hold the latch lever 25 in engagement with the groove 24 of the pin.

The latch lever 25 is also provided with an upstanding lug 29, which extends through a slot 30, in the top of the casing 1, and through a registering slot 31 in the plate 32 upon which the lock 17 is mounted, the said plate 32 being arranged on the upper face of the casing 1.

The movable portion of the lock 17 is provided with a depending lug 33, and the said lug is adapted to engage the lug 29, to move the latch lever in a direction to release the post or pin 19 to permit the said pin or post to be moved upwardly by the spring 22.

In operation, when it is desired to lock the handle bar, the steering post is turned to bring the plate 15 into the position of Fig. 6, that is, in alinement with the connecting bar 2. The pin 19 is now depressed against the resistance of the spring 22, to cause the lugs 21 of the cross head 20 to engage with the notches 16 of the said plate 15, whereby to hold the said plate from lateral movement. The spring 27 will pull the latch lever into engagement with the groove 24, and the mere depression of the pin 19 will lock the steering post from angular movement. When it is desired to release the steering post, the selected pins 18 of the lock are depressed to release the movable portion thereof from its fixed support and when so released, the movable portion of the lock may be moved angularly to cause the lug 33 to engage the lug 29 to move the latch lever away from the pin or post 19 as indicated in dotted lines in Fig. 5, whereby to release the said post in order that the spring 22 may move the same upwardly to release the plate 15. The steering post is now free, and may be operated in the usual manner. While of course it is possible to wheel the bicycle away when the handles are locked and even possible to ride the wheel, yet it cannot be steered, so that the lock forms a sufficient safeguard for preventing stealing of the same or its removal by unauthorized persons.

While it is possible to swing the handle bars with great difficulty, yet the wheel fork cannot be moved without breaking the lock or at least the tongues 14 on the locking plate, and such breakage would be an exceedingly difficult proposition.

I claim:—

1. The combination with the steering fork of a bicycle provided with oppositely arranged longitudinally extending grooves, of a plate having an opening for receiving the fork and having tongues for engaging the grooves, said plate having at its free end spaced notches or recesses, a casing connected with the bicycle above the plate, said casing having an opening for receiving the fork, a pin or post mounted for vertical movement at the rear end of the plate and having a cross head provided with lugs for engaging the notches of the plate to prevent lateral movement of the said plate, a spring normally pressing the pin or post upward, said pin or post having an annular groove, a latch lever pivoted at one end within the casing and engaging intermediate its ends with the groove to hold the pin in depressed position, said lever having an upstanding lug and the casing having an opening through which the lug extends, a combination lock having a rotatable element mounted above the plate and having the pin for its axis, the rotatable element of the said lock having means for engaging the lug of the latch lever to release the said latch lever from the post when the said element is rotated in the proper direction.

2. The combination with a steering fork of a bicycle having oppositely arranged longitudinally extending grooves, of a locking plate having an opening for receiving the fork and having locking tongues for engaging the grooves, said plate having at its free end spaced notches, a casing connected with the bicycle above the plate and having an opening for receiving the steering fork, a pin or post mounted for vertical movement transversely of the plate and having lugs for engaging the notches of the plate to prevent lateral movement thereof, a spring normally pressing the pin or post upward, said pin or post having an annular groove, a latch lever pivoted within the casing and engaging the groove to hold the post in depressed position, a combination lock mounted on the casing and having a rotatable element rotating on the pin for an axis and having means for engaging the latch lever to release the same from the post when the said movable element is rotated in the proper direction, and means acting normally to move the lever toward the post.

3. The combination with the steering fork of a bicycle having oppositely arranged longitudinally extending grooves, of a locking plate having an opening for receiving the fork and having locking tongues for engaging the grooves, said plate having at its free end spaced notches, a casing connected with the bicycle above the plate and having an opening for receiving the steering fork, a pin or post mounted for vertical movement transversely of the plate and having lugs for engaging the notches of the plate to prevent lateral movement thereof, a spring normally pressing the pin or post upward, normally active latch mechanism for holding the post in depressed position, and in engagement with the plate, a combination lock on the casing and having a rotatable element provided with means for engaging and releasing the latch mechanism when the said element is rotated in the proper direction.

4. The combination with the steering fork of a bicycle, of a plate rigidly connected therewith and extending rearwardly therefrom, a combination lock mounted on the bicycle and having a rotatable element, a pin upon which the said element rotates, the said pin being movable vertically with respect to the said element and having means for engaging and holding the plate from angular movement when the said pin is in lowered position, latch mechanism for holding the pin in lowered position, said rotatable element having means for releasing the latch mechanism when the said element is rotated in the proper direction, and a spring normally pressing the pin upwardly.

5. The combination with the steering fork of a bicycle, of a plate rigidly connected therewith and extending rearwardly therefrom, a combination lock mounted on the bicycle and having a rotatable element, a pin upon which the said element rotates, said pin being movable vertically with respect to the said element and having means for engaging and holding the plate from angular movement when the said pin is in lowered position, and latch mechanism for holding the pin in lowered position, said rotatable element having means for releasing the latch mechanism when the said element is rotated in the proper direction.

GEORGE A. WEHNER.

Witnesses:
E. D. FALLON,
H. BRUECKMANN.

Copies of this patent may be obtained for five cents each, by addressing the "Commissioner of Patents, Washington, D. C."